United States Patent
Melvin

[11] 3,970,829
[45] July 20, 1976

[54] COMPOSITE SITUATION ANALYZER AND INSTRUMENT FLIGHT SYSTEM

[76] Inventor: William W. Melvin, 8434 Greenstone Drive, Dallas, Tex. 75231

[22] Filed: Dec. 23, 1974

[21] Appl. No.: 536,948

[52] U.S. Cl. .................. 235/150.22; 73/178 R; 235/150.2; 340/27 R
[51] Int. Cl.² ........................... G06G 7/78
[58] Field of Search ....... 235/150.2, 150.22, 150.25, 235/150.76, 150.77; 244/77 A, 77 D, 77 E, 77 F, 77 G; 73/178; 340/27 R, 27 NA

[56] References Cited
UNITED STATES PATENTS

| | | | |
|---|---|---|---|
| 2,941,400 | 6/1960 | Nesbitt | 73/178 |
| 3,128,445 | 4/1964 | Hosford | 235/150.22 |
| 3,400,364 | 9/1968 | Musgrave et al. | 73/178 |
| 3,400,581 | 9/1968 | Bostwick | 73/178 |
| 3,776,455 | 12/1973 | Gee | 235/150.22 |

*Primary Examiner*—Jerry Smith
*Attorney, Agent, or Firm*—Sughrue, Rothwell, Mion, Zinn & Macpeak

[57] ABSTRACT

Flight path angle is displayed relative to the aircraft reference indicator in a unique display and aircraft control system particularly useful during approach operations. Flight path angle is computed as a function of vertical velocity of the aircraft and air speed. Angle of attack is displayed as an angle relative to the flight path angle and is derived by computing the difference between pitch and flight path angle. In addition to displaying actual angle of attack and actual flight path angle, the system is capable of computing and displaying an angle of attack command and a velocity vector command. The velocity vector command comprises both heading command functions and thrust command functions. In the approach mode, a pitch command computer produces a pitch command signal for controlling an aircraft's pitch to maintain a desired angle of attack, and hence, a desired air speed; a thrust command computer produces a thrust command signal for conrolling the flight path angle to maintain an aircraft on a desired glide path for landing; and a desired heading command computer produces a heading command signal for controlling the aircraft's heading to maintain a desired course or heading depending upon mode selection. The command signals, in addition to controlling the unique integrated display, alternatively control an auto-pilot and auto-throttle for automatic operation of the aircraft. In addition to the approach mode, the unique display and control system offers advantages in all other modes of an aircraft's operation. The display may be implemented either mechanically or electronically.

21 Claims, 8 Drawing Figures

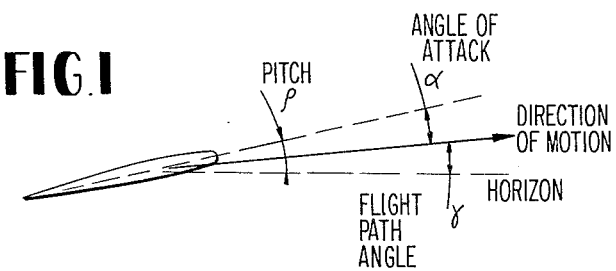
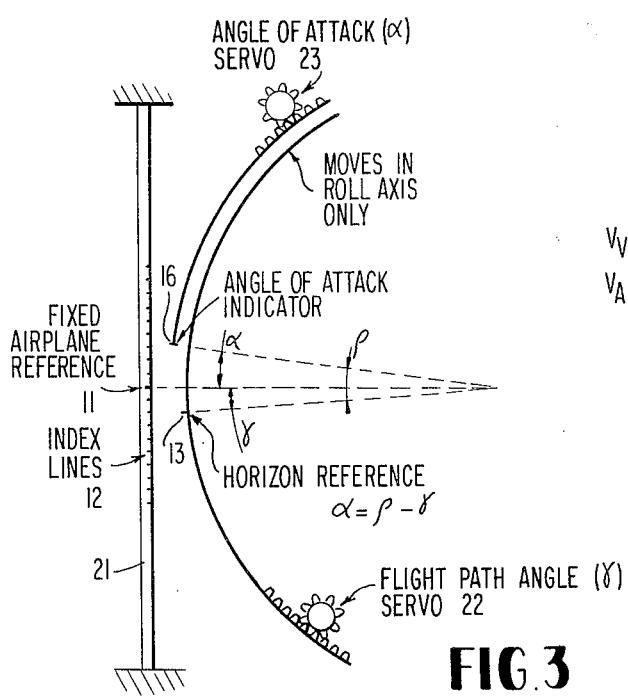
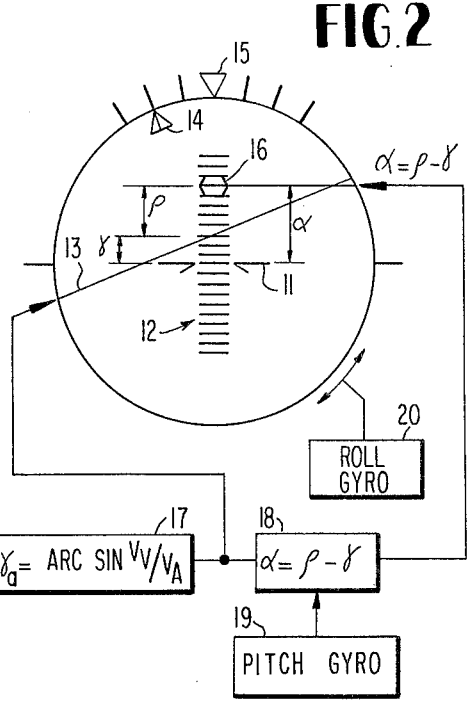
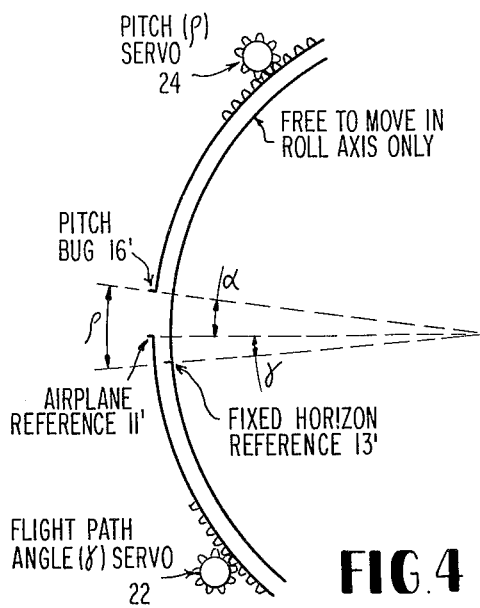
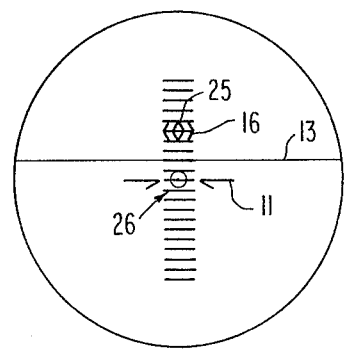

COMPOSITE SITUATION ANALYZER AND INSTRUMENT FLIGHT SYSTEM

BACKGROUND OF THE INVENTION

1. Field of the Invention

The present invention generally relates to aircraft display and control systems, and more particularly, relates to a system providing a uniquely integrated display of aircraft performance and for controlling the flight path of the aircraft in which the thrust is varied to maintain the aircraft on a desired glide path, and the pitch of the aircraft is varied to maintain a desired angle of attack.

2. Description of the Prior Art

In normal flight, an aircraft's motion is controlled by its heading, thrust and angle of attack. Since air speed is a direct function of an aircraft;'s angle of attack, the angle of attack is usually controlled by a reference to the aircraft's air speed. Pitch and thrust, however, have primary and secondary effects upon an aircraft's flight performance. The primary effect of a change in pitch is that it causes a directly proportional change in the angle of attack because of the relationship between the aircraft's angle of attack, its pitch, and its flight path angle. The secondary effect of a change in pitch is that it causes a change in the thrust requirement to maintain a steady state flight condition. This secondary effect occurs because of the relationship between the angle of attack and the drag. Moreover, the secondary effect of a pitch change is highly variable and can be either positive or negative. The primary effect of a change in thrust is that it causes a change in the aircraft's flight path angle which is, in turn, dependent upon the relationship between the flight path angle, drag and thrust. The secondary effect of a change in thrust is that it causes a change in the angle of attack because of the relationship between the angle of attack, flight path angle and pitch.

Prior art manual and automatic control system which use computed command signals for control of the aircraft on approach have used a method of control whereby pitch is used to control the aircraft's position on a glide path with the resultant effect that the angle of attack was corrected with thrust corrections. This method is quite useful for cruise flights where strong speed stability exists; however, the use of this method during an approach operation has serious faults since there is a time lag before the effects of a control are observed. For example, if an aircraft is going below the glide path, additional thrust is needed to increase the flight path angle, but the prior art systems have instead changed the pitch to cause the aircraft to fly to the glide path. This causes an increase in angle of attack which is indicated by a decrease in air speed. This change in angle of attack or air speed is then noted and a thrust correction is applied which changes the flight path angle, resulting in a change to the angle of attack. When the aircraft returns to the glide path, the pitch is again changed and the thrust is also varied after the results of the pitch change are evident.

In my prior U.S. Pat., No. 3,586,268, I disclose an improved flight control system in which, in the approach mode, the angle of attack of the aircraft is controlled entirely by pitch command signals and the position on a glide path is controlled entirely by thrust command signals. Thus, my earlier system implements the principle that the thrust level, rather than the pitch, should be used to correct for glide path displacements, and the pitch should be used to control the angle of attack or air speed. The actual method employed is first, to reduce the rate of displacement of the aircraft from the glide path to zero by thrust control, and second, by further thrust control to gradually return the aircraft to the glide path. The magnitude of the corrective thrust which must be applied for a given angular displacement from the glide path is proportional to the distance the aircraft is from the touch-down point. Hence, corrective thrust for a given angular displacement from the glide path is applied at a greater magnitude when the aircraft is at a greater distance from touch-down. At all times during the thrust corrections, pitch command signals enable the pilot or auto-pilot to control the aircraft with reference to a desired angle of attack. Separate pitch and thrust command displays are provided to facilitate manual approach operation by the pilot.

Existing flight instruments display the horizon reference relative to the aircraft's pitch. The problem with present aircraft instrumentation is that pitch or attitude is not directly useable by the pilot for control of the aircraft. The pitch information must be integrated with other information such as sink rate and air speed for the pilot to determine exactly what is happening to his aircraft. This problem has been recognized in the prior art, and there have been several attempts to provide integrated flight instrumentation. One such example is the patent to J. O. Nesbitt, Ser. No. 2,941,400 which discloses a flight control indicator having a fixed reference aircraft mark, a rate of change in altitude bar and an angle of attack bar. The Nesbitt instrument displays rate of climb or descent as the primary reference, and while Nesbitt does provide an angle of attack display, this display is not in terms of an angular function the pilot can readily read. Instead, the Nesbitt display causes the angle of attack indicator to go out of view at low angle of attack (high speed) and to descend toward the reference bar at high angles of attack (low speed). When the angle of attack indicator touches the reference bar in the Nesbitt display, the aircraft is in a stall condition (maximum angle of attack for all practical purposes). Thus, Nesbitt's angle of attack bar is really a stall warning device and does not indicate the amount of angle of attack. Furthermore, Nesbitt's choice of having the zero rate of climb reference fixed in terms of the reference bar, causes an increasing sink rate to be read as an increasing upward number, and vice versa, making interpretation of the display rather difficult.

Notwithstanding the limitations just noted, the Nesbitt flight control indicator is admirable for its relative simplicity. The recent trend in the industry is to provide very sophisticated and complex integrated flight instrumentation. Because of their sophistication and the amount of information to be displayed, such flight instruments typically are implemented with cathode ray tube (CRT) displays. Typical of such instrumentation is the U.S. Pat. No. 3,668,622 to James R. Gannett et al. Typically, in such sophisticated flight instrumentation, a number of flight parameters and commands are displayed. For example, in the Gannett et al. system, flight path angle is displayed, but it is not correlated to the other functions. The result is a complicated maze of information which is very difficult for the pilot to interpret.

SUMMARY OF THE INVENTION

It is therefore an object of the present invention to provide a unique, integrated flight display which is compatible with my earlier patent to an instrument flight system and method, but which is capable of being used by itself to greatly improve the ease of flight parameter interpretation by a pilot.

It is another and more specific object of this invention to provide a unique flight instrument which displays flight path angle relative to the aircraft reference indicator and greatly simplifies the material to be presented thereby making the pilot's job of interpretation much easier.

A further object of the invention is to provide an aircraft display which is uniquely suitable for use with an aircraft control system which employs thrust level control to correct for glide path displacements and pitch control to maintain a desired angle of attack or air speed.

The foregoing and other objects of the invention are obtained by providing a composite situation analyzer (CSA) in which the relationship between the fixed aircraft indicator and the horizon, as far as vertical displacement is concerned, is the aircraft's flight path angle. Actually, what is seen by the pilot is the flight path angle relative to the horizon. In a preferred embodiment, the flight path angle is computed as a function of the vertical velocity, or rate of climb or descent, and the air speed. Alternatively, the flight path angle can be determined by inertial means, if available. Angle of attack is present on the CSA as an angle relative to the flight path angle. The angle of attack is itself computed by subtracting the flight path angle from the pitch of the aircraft, where the pitch is derived from a remote pitch or attitude gyro. In the display according to the invention, the values of pitch and flight path angle above the horizon are considered positive and those below the horizon, negative. Angle of attack is always positive with respect to flight path angle. The advantage of this display is that the pilot has instant knowledge of where the aircraft is going relative to the horizon as well as its angle of attack, all without reference to any other instrument. In another version of the display according to the invention, command information is displayed in the form of an angle of attack command and a combination heading and flight path angle or thrust command. Such a system is uniquely suitable to the flight system disclosed in my prior U.S. Pat. No. 3,586,268, but it is not suitable to the method of flight control used by present auto-pilots. The system according to the invention being highly adaptable to varying situations is capable in a preferred embodiment of displaying heading command alone if data for thrust command is not available, as for example, in a non-precision approach. The invention can be implemented either as a servo mechanical device, as is now commonly used, or a CRT display, which is preferred in some situations due to its inherent flexibility.

BRIEF DESCRIPTION OF THE DRAWINGS

The specific nature of the invention, as well as other objects, aspects, uses and advantages thereof, will clearly appear from the following description and from the accompanying drawings in which:

FIG. 1 illustrates the geometric relation between pitch, angle of attack and flight path angle;

FIG. 2 is a block-diagram illustrating the simplest form of the display according to the invention incorporating roll, pitch, angle of attack and flight path angle;

FIG. 3 is a cross-sectional view illustrating a servo-mechanical implementation of the display shown in FIG. 2;

FIG. 4 is a cross-sectional view illustrating an alternative servo mechanical implementation of the display in FIG. 2;

FIG. 5 illustrates the basic display according to the invention with angle of attack command and flight path angle or thrust command displayed;

DESCRIPTION OF THE PREFERRED EMBODIMENTS

Figure 6:
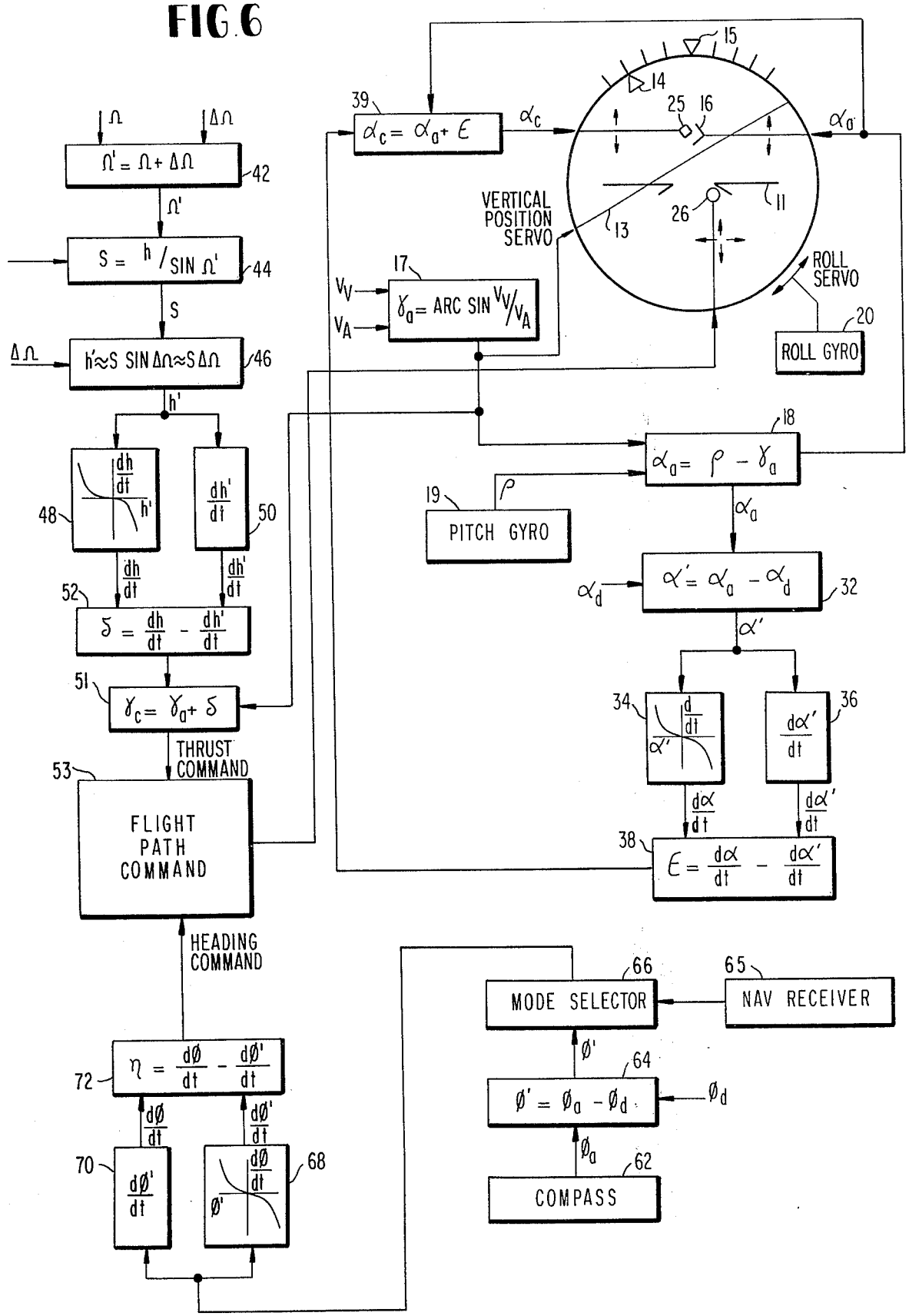
FIG. 6 is a block-diagram illustrating a preferred embodiment of the composite situation analyzer and flight control system according to the invention.

Referring now to the drawings, and more particularly to FIG. 1, there is shown a cord of an aircraft wing with reference to a horizontal or horizon line. The angle of inclination of the wing to the horizon is defined as the pitch represented by $\rho$. The direction of motion vector of the aircraft wing is at an angle $\gamma$ to the horizon. This angle $\gamma$ is the flight path angle. The difference between the pitch angle and the flight angle is the angle of attack $\alpha$. Thus, the angle of attack may be represented by the following expression:

$$\alpha = \rho - \gamma$$

The flight path angle $\gamma$ is itself a function of the vertical velocity or rate of climb or descent $V_v$ and air speed $V_a$ according to the following relationship:

$$\gamma = \arcsin \frac{V_v}{V_a}$$

of course, for small flight path angle $\gamma$, this relationship can be simplified to the following expression:

$$\gamma \cong \frac{V_v}{V_a}$$

The composite situation analyzer display according to the invention is illustrated in its simplest form in FIG. 2. The display is provided with a fixed aircraft indicator 11 and vertical index lines 12. Each index line 12, may, for example, represent 1° of vertical angle. The horizon reference is shown at 13, and for purposes of illustration, a 20° bank angle is indicated. The bank of the aircraft is displayed not only by the inclination of the reference horizon 13, but also by the displacement of a bank indicator 14 with respect to a reference, wings level, indicator 15. Finally, an angle of attack indicator 16 is shown as a vertical displacement from the fixed aircraft reference 11. In the display as illustrated in FIG. 2, in addition to a 20° bank, a flight path angle of −3° and an angle of attack of 48° is shown. Note that pitch is always the relationship between the angle of attack and the horizon, in this case 5°. It will be appreciated that a significant advantage of this display is that the pilot has instant knowledge of where the aircraft is going relative to the horizon as well as its angle of attack, all without reference to any other instrument.

The moveable display indicia, such as the horizon reference, angle of attack and bank, are controlled by inertial reference and the computation of certain flight parameters. Specifically, the flight path angle $\gamma$ which controls the horizon reference is computed by the network 17 as the arc sin $V_v/V_a$, where $V_v$ is the aircraft vertical velocity and $V_a$ is the air speed. Both $V_v$ and $V_a$ are available as signals in normal aircraft instrumentation. In addition, for small angles $\gamma$ can be simply approximated as the quotient of $V_v/V_a$. Thus, network 17 may be a simple analog dividing network. For more accurate computation, an arc sine function generator would also be required to implement network 17. Both analog divider networks and arc sine function generator networks are well known in the art and require no further explanation. The output signal from network 17 which represents the flight path angle $\gamma$ is used to displace the horizon reference 13 in the display. In addition, the output signal from network 17 is supplied to the summing network 18 which computes the angle of attack $\alpha$. As previously mentioned, the angle of attack $\alpha$ is the difference between the pitch $\rho$ and the flight path angle $\gamma$. The pitch is supplied by a remote pitch gyro 19. The output signal from the summing network 18 representing the angle of attach $\alpha$ is used to control the movement of the angle of attack indicator 16 in the display. Finally, a remote roll gyro 20 is used to rotate the horizon display 13 and the bank angle indicator 14 in a well known manner. It will be understood by those skilled in the art, that the pitch gyro 19 and the roll gyro 20 may, in fact, be a single 2° of freedom angular inertial reference of well known type.

There are actually a number of ways in which the display illustrated in FIG. 2 can be implemented once the flight path angle $\gamma$ and the angle of attack $\alpha$ have been computed. One such way is illustrated in FIG. 3 wherein the fixed airplane reference 11 and the index lines 12 are inscribed on the back of a transparent face plate 21. The signal from network 17 representing the flight path angle $\gamma$ is used to drive servo 22 to displace the horizon reference 13 with respect to the fixed airplane reference 11. In a similar fashion, the signal from summing network 18 representative of the angle of attack $\alpha$ would be used to energize a servo 23 which would move the angle of attack indicator up and down with respect to the fixed airplane reference 11. Notice that the angular measurement between the horizon reference 13 and the angle of attack indicator 16 is the pitch $\rho$ of the aircraft. In an electromechanical implementation of the display shown in FIG. 3, the summing network 18 may be a mechanical differential where flight path angle and pitch are fed into it as shaft positions, and the output shaft position used to displace the angle of attack indicator 16 directly. Alternatively, a differential servo can be used for summing network 18. In viewing FIG. 3, it should be remembered that a third dimension is not shown and that the flight path angle servo 22 and the horizon reference 13 are free to move in the roll axis as well.

An alternative implementation of the mechanical display is illustrated in FIG. 4. In this case, however, the horizon reference 13' is fixed, and the airplane reference 11' is moveable in the vertical direction. While the horizon reference 13' is fixed in the vertical direction, it is free to move in the roll axis to display bank of the aircraft. A signal representative of the flight path angle $\gamma$ is computed as before, but in this implementation the flight path angle servo 22 displaces the airplane reference 11' with respect to the fixed horizon reference 13'. It will, of course, be recognized that the relative displacements are exactly the same as illustrated in FIG. 3. An advantage to the implementation illustrated in FIG. 4 is that pitch can be displayed directly in reference to the fixed horizon reference thereby avoiding the need for the summing network 18. More particularly, the output from the pitch gyro 19 is used to drive a pitch servo 24 to displace a pitch bug 16' with respect to the fixed horizon reference 13'. The angle of attack $\alpha$ is then the difference between the airplane reference 11' and the pitch bug 16'. This arrangement allows the face of the instrument to be used as the means for resolving the pitch and flight path angle relationship to determine angle of attack.

FIG. 5 shows the composite situation analyzer display with an angle of attack command 25 and a flight path angle and heading command 26 as well as the fixed aircraft indicator 11, the horizon reference 13 and the angle of attack indicator 16. The angle of attack command 25 is computed in the same manner as in my instrument flight system which is the subject of U.S. Pat. No. 3,586,268. The flight path angle command is represented by a vertical displacement of the "bug" 26 with respect to the fixed aircraft reference 11, while the heading command is represented by a lateral or horizontal displacement of the "bug" 26 with respect to the fixed aircraft reference 11. In practice, the flight path angle command is a thrust command as explained in my prior U.S. Pat. No. 3,586,268.

FIG. 6 illustrates how the command functions may be implemented in the basic display shown in FIG. 2. As before, the summing network 18 generates a signal which is representative of the actual angle of attack $\alpha_a$ of the aircraft. However, in addition to controlling the displacement of the angle of attack indicator 16, this signal is also supplied to the summing network 32 which generates a difference signal $\alpha'$ which represents the difference between the actual angle of attack $\alpha_a$ and the desired angle of attack $\alpha_d$. The shaping network 34 accepts the output of the summing network 32 and determines the rate at which the difference $\alpha'$ between the actual angle of attack and the desired angle of attack should be corrected. This rate of correction is predetermined but is proportionately larger for larger values of $\alpha'$. The differentiator 36 also receives the output $\alpha'$ from summing network 32 and differentiates the $\alpha'$ signal to produce a signal proportional to the rate of change of this variation. The difference between the outputs of the shaping network 34 and the differentiator 36 is then calculated by the summing network 38 to produce a signal that represents the difference $\epsilon$ between the desired rate of return and the actual rate of return. The angle of attack command signal $\alpha_c$ is generated by summing the difference signal $\epsilon$ with the actual angle of attack signal $\alpha_a$ in summing network 39. This signal is displayed by the angle command $\alpha_c$ "bug" 25 on the composite situation analyzer display. When the actual angle of attack is at the desired value, the angle of attack indicator 16 and the command "bug" 25 will be vertically coincident. Any rate of change of the angle of attack will be sensed immediately, and the "bug" 25 will show the direction in which to change pitch of the aircraft in order to zero the rate of change of the angle of attack. Furthermore, departure from the desired angle of attack will result in a corrective rate of return of the desired angle of attack. For example, if the angle of attack is increased to some value greater than that desired, then its rate of change is in the positive direction, and the indicator will show a negative value indicating a negative pitch correction is required by the pilot or the auto-pilot. As soon as the actual rate of change of the angle of attack reverses and becomes equal to the desired rate of return, the command angle of attack bug 25 will center opposite the angle of attack indicator 16. Then, as the desired angle of attack is approached, the bug 25 will gradually rise because of the lesser amount of correction called for by the shaping network 34. By making the appropriate pitch corrections, the pilot or auto-pilot can keep the bug 24 zeroed and cause a perfect return to the desired angle of attack. In the thrust command computer, the angle $\Omega$ between ground level and the desired position of the aircraft on the glide path and the angular difference $\Delta\Omega$ between this angle and the angle between the actual position of the aircraft and ground level are conveniently determined and used as inputs to the summing network 42 which calculates the angle $\Omega'$ between the actual position of the aircraft and ground level. The altitude $h$ of the aircraft above the runway is determined by subtracting the field elevation from the aircraft's actual altitude above mean sea level. This altitude $h$ with the output from the summing network 42 provides the inputs to the dividing network 44. The actual distance S of the aircraft from the landing field is calculated by the dividing network 44 which divides the altitude $h$ by $\sin \Omega'$. A multiplier 46 calculates the linear displacement $h'$ of the aircraft from the desired glide path since, for small angles, $\sin \Delta\Omega = \Delta\Omega$. Alternate means to determine the displacement $h'$ can be substituted. Taking the $\Delta\Omega$ signal from the glide slope receiver and modifying it with a linear gain program based upon time from a fixed ground reference such as the outer marker or from an elevation above the ground will provide an approximation of linear displacement $h'$ from the desired glide path position, or modifying the $\Delta\Omega$ signal with a distance signal from a ground source will produce an accurate value of $h'$. It is also possible to use $\Delta\Omega$ directly without modification because the method of flight control utilized by the present invention does not cause oscillations as the sensitivity of the glide path increases. The rate of return $dh/dt$ to correct for this linear displacement $h'$ is determined by shaping network 48. The rate of the correction is predetermined but is proportionately larger for a larger linear displacement. The linear displacement $h'$ is also differentiated by the differentiating network 50 to determine the actual rate of displacement of the aircraft from the desired glide path. The outputs of the shaping network 48 and the differentiator 50 are applied as inputs to a summing network 52 which produces an output signal $\delta$ which is proportional to the difference between these input signals. The difference signal $\delta$ is added to the actual thrust signal $\gamma_a$ from network 17 in summing network 51 to produce an output signal. This output signal is the thrust command $\gamma_c$ and is supplied to the flight path command network 53. The thrust command is displayed by vertical displacement of the bug 26. Adding or subtracting thrust to zero the bug 26 with respect to the fixed aircraft reference 11, results in a smooth flight and a return to the glide path. By employing this method, a rate of displacement from the glide path is immediately indicated, and a signal is displayed as a thrust command for corrective action. In addition, the aircraft will return to the glide path from any displaced position at the desired rate by merely keeping the bug 26 zeroed vertically with respect to the aircraft reference 11.

In the heading command computer, the actual heading $\Phi_a$ derived from a compass 62 is supplied as one input to the summing network 64. The other input to the summing network 64 is the desired heading $\Phi_d$. The summing network 64 computes the difference $\Phi'$ of the actual heading and the desired heading and supplies a difference signal to mode selector 66. A signal analogous to the heading difference signal $\Phi'$ is also supplied to the mode selector 66 from a navigation receiver 65 of well known type. Thus, the mode selector 66 may selectively provide the output of summing network 64 or the output of the navigation receiver 65 to the inputs of the shaping network 68 and the differentiating network 70. The rate of return $d\Phi/dt$ to correct for a lateral displacement in heading $\Phi'$ is determined by the shaping network 68. The rate of correction is predetermined but is proportionately larger for a larger linear displacement. The displacement in heading $\Phi'$ is also differentiated by differentiating network 50 to determine the actual rate of displacement of the aircraft from the desired heading. The outputs of the shaping network 68 and the differentiator 70 are applied as inputs to a summing network 72 which produces an output signal $\eta$ which is proportional to the difference between these two input signals. This output signal $\eta$ is the heading command and is provided to the flight path command network 53. The output of flight path command network 53, while illustrated as one line for sake of simplicity and clarity, is in fact two signals: one driving the bug 26 vertically and the other driving the bug 26 horizontally. The heading command is displayed as a lateral displacement of the bug 26. Thus, a rate of displacement from the desired heading is immediately indicated and displayed as a heading command for corrective action. The aircraft will return to the proper heading from any displaced position at the desired rate by merely keeping the bug 26 zeroed laterally or horizontally with respect to the fixed aircraft reference 11.

In the preferred embodiment, the shaping networks 34, 48 and 68 implement simple linear relationships of the type $Y = -K_1 X$, where the output Y is a negative linear relationship of the input X, and $K_1$ is a constant of proportionality. As is well known, operational amplifiers with resistive input and feedback networks exhibit this form of response.

Those skilled in the art will understand that the command signals $\alpha_c$ and $\gamma_c$ must be displayed relative to the actual signals. In other words, the signal causing movement of the $\alpha_c$ bug 25 must be a summation of the $\alpha_a$ and $\epsilon$ signals, and the signal causing movement of the $\gamma_c$ bug 26 in the vertical direction must be the summation of the $\gamma_a$ and $\delta$ signals. The heading command does not require a similar summation since the center of the display is the zero reference point for the heading command. On the other hand, the zero reference points for the angle of attack and thrust commands are $\alpha_a$ and $\gamma_a$, respectively.

Figure 7:
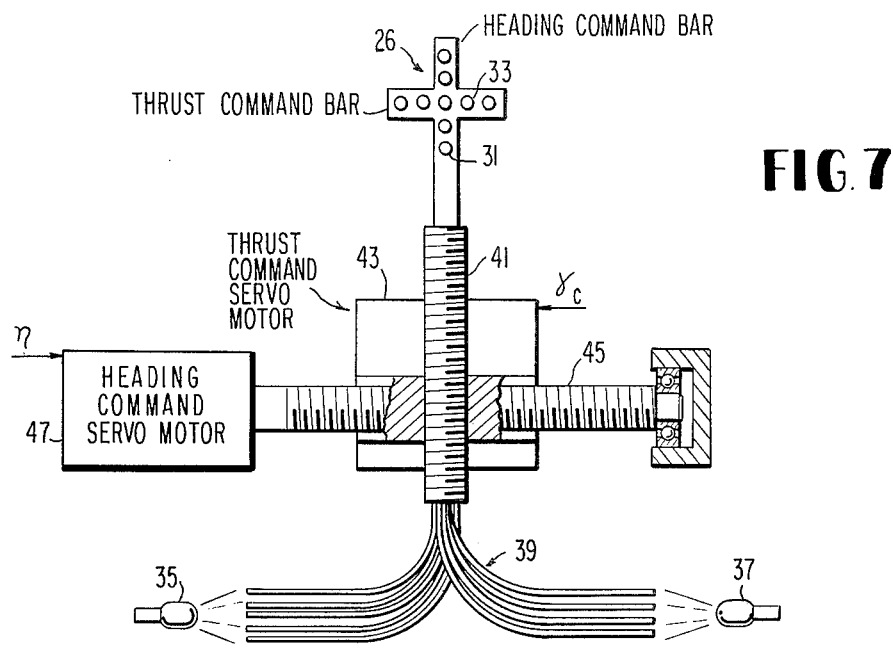
FIG. 7 is a partially cross-sectional view illustrating a preferred embodiment of the flight path command symbol used in the composite situation analyzer and flight control system illustrated in FIG. 6.

FIG. 7 is a preferred alternative embodiment of the flight path command bug 26 which permits the display to be used to show only heading command if data for thrust command is not available. The bug 26 in this embodiment takes the form of a cross with the vertical member or heading command bar and a horizontal member or thrust command bar. The cross is preferably made of a transparent material so as not to obscure other portions of the display but is made highly visable by a vertical row of lights 31 and a horizontal row of lights 33. The rows of lights 31 and 33 are actually the ends of optical fibers which are separately illuminated at their opposite ends by heading command light source 35 and a thrust command light source 37, respectively. The optical fibers 39 pass through a lead screw 41 to the bug 26. The lead screw is driven by the thrust command servo 43 to move the bug 26 vertically. Horizontal movement of the bug 26 is accomplished by lead screw 45 which carries servo 43 and is in turn driven by heading command servo 47.

In operation, if only heading command is used, then only the vertical row of lights 31 are illuminated by the heading command light 35. If data is available for thrust command, all lights 31 and 33 are illuminated by heading and thrust command lights 35 and 37. When neither heading or thrust commands are generated, it is desirable to retract the bug 26 to the bottom of the composite situation analyzer display out of the field of vision. This is readily accomplished by the thrust command servo 43. By applying a bias signal to the thrust command servo motor any time a heading command is used (with or without a thrust command), the bug 26 will be made to appear in the display.

Figure 8:
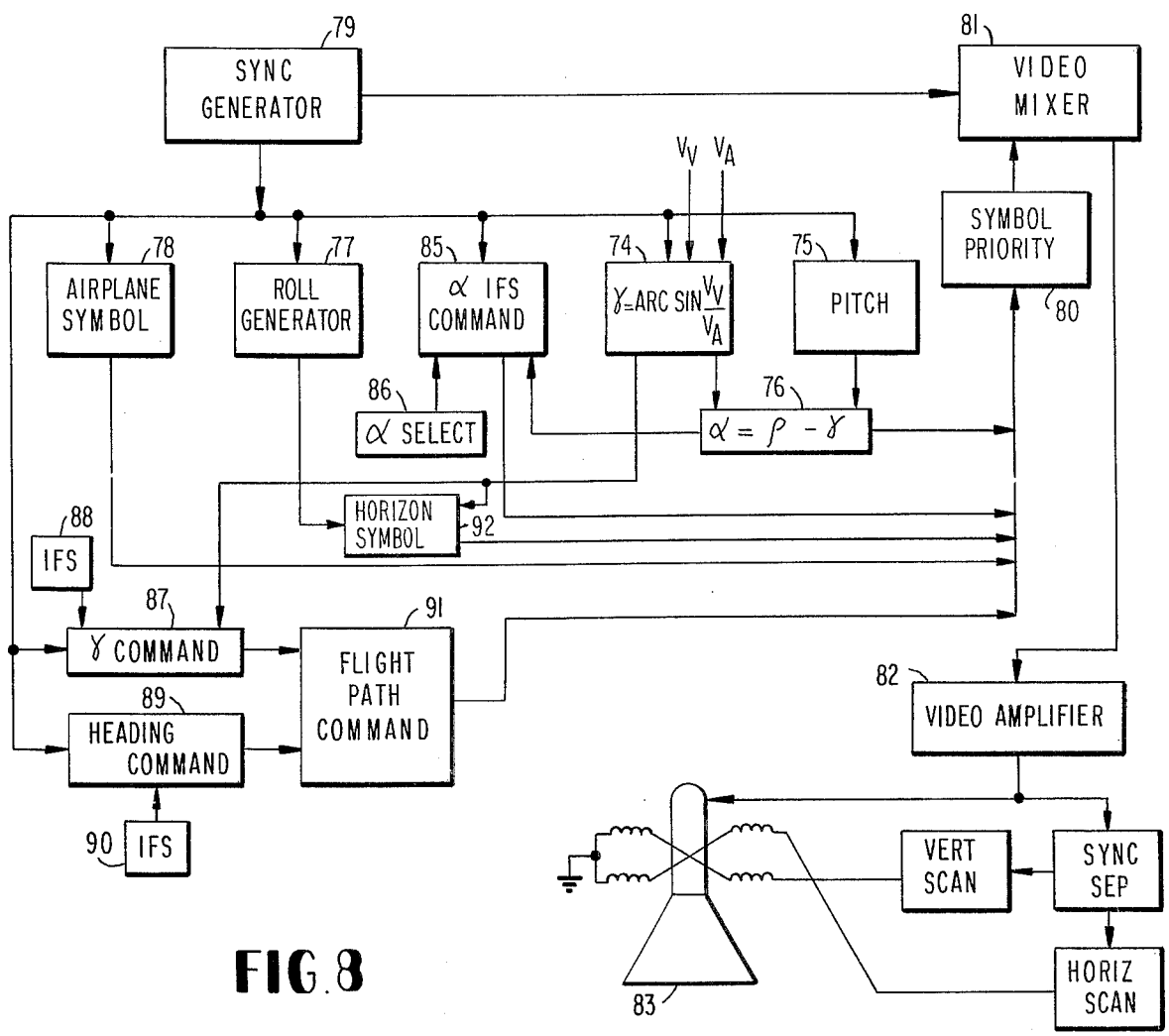
FIG. 8 is a block-diagram illustrating the manner of implementing the composite situation analyzer and flight control system with a CRT display.

While the system illustrated in FIG. 6 could be implemented mechanically in a manner similar to that illustrated in FIGS. 2 and 3 of the drawings, it will be recognized by those skilled in the art that the more complex display of FIG. 6 with its command indicia readily lends itself to implementation in a cathode ray tube (CRT) display. Such a CRT system is illustrated in FIG. 8 and, of course, displays the same data as the mechanical displays. As in the mechanical display, the CRT display receives inputs from a plurality of sensors and pilot-operated controls. From these inputs, a plurality of symbol generators develop pulses which define the location, at any given instant in time, of each symbol to be displayed. For example, the network 74 receives the aircraft vertical velocity $V_v$ and air speed $V_a$ and computes the flight path angle $\gamma$ and provides an output signal indicative of the displacement of the horizon reference symbol. Network 75 receives pitch information from the remote pitch gyro and generates a signal indicative of the aircraft pitch. From the outputs of networks 74 and 75, the summing network 76 computes the angle of attack $\alpha$. The output of the summing network 76 is then a signal indicative of the displacement of the angle of attack symbol. The remote gyro also supplies roll information to the roll generator network 77 which provides an output signal indicative of the bank symbol. The outputs of the network 74 and roll generator are supplied to the horizon symbol generator 92 which provides an output signal indicative of the horizon. While the aircraft symbol could be inscribed on the face of the CRT display, it can also be generated by the airplane symbol generator 78 shown in FIG. 7. Those skilled in the art will recognize that the functions of the networks thus far described are analogous to the basic display shown in FIG. 2 of the drawings. Each of the networks 74 and 75 and the roll symbol generator 77 and airplane symbol generator 78 are controlled by a sync generator 79 in a conventional manner. The outputs of the summing network 76, the horizon symbol generator 92 and the airplane generator 78 are supplied to the symbol priority circuit 80 and thence to the video mixer 81 which is also controlled by the sync generator 79. The output of the video mixer 81 is supplied to a video amplifier 82 which controls the electron beam of a cathode ray tube 83. The cathode ray tube beam is scanned in a well known manner both vertically and horizontally to generate the display.

Angle of attack command and flight path command can also be displayed in the CRT system shown in FIG. 8. To this end, an $\alpha$ command computer 85, similar to that shown in FIG. 6 of the drawings, is controlled by the sync generator 79 and receives as inputs the output of the summing network 76 and the desired angle of attack selector 86 and generates a signal corresponding to the $\alpha$ command symbol. The output signal from the $\alpha$ command computer 85 is supplied to the symbol priority network 80. There is also provided a flight path angle or thrust command computer 87 also controlled by the sync generator 79 and receiving as an input the desired aircraft glide path angle from selector 88. A heading command computer 89 controlled by the sync generator 79 and receiving as an input the desired heading angle from selector 90 is also provided. It will be recognized that both the thrust command computer 87 and the heading command computer 89 are similar to the corresponding computers shown in FIG. 6 of the drawings. The outputs of both of the computers 87 and 89 are supplied to the flight path command circuit 91 which provides an output signal indicative of the thrust and heading command symbol to the symbol priority circuit 80. The symbol priority circuit 80 is designed to provide only one output signal from the several input signals it receives at any given time to the video mixer 81.

It will be apparent that the embodiments shown are only exemplary, and that various modifications can be made in construction and arrangement within the scope of the invention as defined in the apended claims.

What is claimed is:

1. An aircraft control system display comprising:
   an aircraft reference indicator,
   a horizon reference indicator,
   means for producing a relative displacement of said aircraft and horizon reference indicators as a function of flight path angle of the aircraft,
   an angle of attack indicator, and
   means for producing a displacement of said angle of attack indicator with respect to said aircraft reference indicators as a function of the difference between the pitch and the flight path angle of the aircraft.

2. An aircraft control system display as recited in claim 1 wherein said aircraft reference indicator is fixed on the display and the horizon reference is moveable vertically.

3. An aircraft control system display as recited in claim 2 wherein said horizon reference is also moveable in the roll axis and further comprising means for producing an angular displacement of said horizon reference indicator as a function of the bank angle of the aircraft.

4. An aircraft control system display as recited in claim 1 wherein said horizon reference indicator is fixed vertically on the display and the aircraft reference indicator is moveable vertically.

5. An aircraft control system display as recited in claim 4 wherein said horizon reference is moveable in the roll axis and further comprising means for producing an angular displacement of said horizon reference indicator as a function of the bank angle of the aircraft.

6. An aircraft control system display as recited in claim 1 further comprising means for computing the flight path angle of the aircraft as a function of the ratio of the aircraft vertical velocity and air speed and supplying a control signal to said means for producing a relative displacement of said aircraft and horizon reference indicators.

7. An aircraft control system display as recited in claim 6 further comprising:
an angle of attack command indicator, and
means for vertically displacing said angle of attack command indicator with respect to said angle of attack indicator as a function of the rate of change of the angle of attack and in a direction to show the direction in which to change the pitch of the aircraft to zero the rate of change of the angle of attack.

8. An aircraft control system display as recited in claim 7 wherein said means for vertically displacing said angle of attack command indicator comprises:
computing means for determining the angular displacement of the aircraft from the desired angle of attack, and
computing means for determining the rate at which the aircraft is being angularly displaced from the desired angle of attack, whereby the aircraft's angular rate of displacement from the desired angle of attack may be first reduced to zero and the aircraft's angular displacement from the desired angle of attack may be secondly reduced to zero.

9. An aircraft control system display as recited in claim 6 further comprising:
a thrust command indicator, and
means for vertically displacing said thrust command indicator with respect to said aircraft reference indicator as a function of the rate of change of displacement of the aircraft from the desired glide path and in a direction to show the direction in which to change the thrust to return the aircraft to the desired path.

10. An aircraft control system display as recited in claim 9 wherein said means for vertically displacing said thrust command indicator comprises:
computing means for determining the linear displacement of the aircraft from the desired glide path, and
computing means for determining the rate at which the aircraft is being displaced from the desired glide path, whereby the aircraft's rate of displacement from the desired glide path may be first reduced to zero and the aircraft's linear displacement from the desired path may be then reduced to zero.

11. An aircraft control system display as recited in claim 6 further comprising:
a heading command indicator, and
means for horizontally displacing said heading command indicator with respect to said aircraft reference indicator as a function of the rate of change of displacement of the aircraft from the desired heading and in a direction to show the direction in which to change the heading to return the aircraft to the desired heading.

12. An aircraft control system display as recited in claim 11 wherein said means for horizontally displacing said heading command indicator comprises:
computing means for determining the rate at which the aircraft is being displaced from the desired heading, whereby the aircraft's rate of displacement from the desired heading may be reduced to zero.

13. An aircraft control system display as recited in claim 6 further comprising:
an angle of attack command indicator,
means for vertically displacing said angle of attack command indicator with respect to said angle of attack indicator as a function of the rate of change of the angle of attack and in a direction to show the direction in which to change the pitch of the aircraft to zero the rate of change of the angle of attack,
a thrust command indicator,
means for vertically displacing said thrust command indicator with respect to said aircraft reference indicator as a function of the rate of change of displacement of the aircraft from the desired glide path and in a direction to show the direction in which to change the thrust to return the aircraft to the desired glide path,
a heading command indicator, and
means for horizontally displacing said heading command indicator with respect to said aircraft reference indicator as a function of the rate of change of displacement of the aircraft from the desired heading and in a direction to show the direction in which to change the heading to return the aircraft to the desired heading.

14. An aircraft control system display as recited in claim 13 wherein said means for vertically displacing said angle of attack command indicator comprises computing means for determining the angular displacement of the aircraft from the desired angle of attack,
computing means for determining the rate at which the aircraft is being angularly displaced from the desired angle of attack, whereby the aircraft's angular rate of displacement from the desired angle of attack may be first reduced to zero and the aircraft's angular displacement from the desired angle of attack may be secondly reduced to zero, wherein
said means for vertically displacing said thrust command indicator comprises computing means for determining the linear displacement of the aircraft from the desired glide path, and
computing means for determining the rate at which the aircraft is being displaced from the desired glide path, whereby the aircraft's rate of displacement from the desired glide path may be first reduced to zero and the aircraft's linear displacement from the desired glide path may be then reduced to zero, and wherein
said means for horizontally displacing said heading command indicator comprises computing means for determining the rate at which the aircraft is being displaced from the desired heading, whereby the aircraft's rate of displacement from the desired heading may be reduced to zero.

15. An aircraft control system display as recited in claim 14 wherein said thrust command indicator and said heading command indicator are a single indicator moveable in both vertical and horizontal directions.

16. An aircraft control system display as recited in claim 15 wherein said display is a cathode ray tube display further comprising:

display synchronizing means, a plurality of symbol generator means synchronized by said synchronizing means and receiving as inputs the outputs of said means for producing a relative displacment of said aircraft and horizon reference indicators, said means for producing a displacement of said angle of attack indicators, said means for vertically displacing said angle of attack command indicator, said means for vertically displacing said thrust command indicator, and said means for horizontally displacing said heading command indicator, said plurality of symbol generator means producing output signals defining the location, size and shape of each of said indicators, priority means receiving the outputs of each of said symbol generator means and providing as an output at any instant in time only one symbol generator means output signal, and mixing means receiving the outputs of said display synchronizing means and said priority means for generating an output video display signal.

17. An aircraft control system display as recited in claim 15 wherein said single indicator is in the form of a cross having a horizontal member and a verticl member, the horizontal member of said cross being said thrust command indicator and the vertical member of said cross being said heading command indicator.

18. An aircraft control system display as recited in claim 17 wherein said cross is made of a transparent material and said horizontal member of said cross is provided with a first row of lights and said vertical member of said cross is provided with a second row of lights.

19. An aircraft control system display as recited in claim 18 wherein said first row of lights are the ends of a first bundle of optical fibers the opposite ends of which are illuminated by a thrust command light source remote from the field of view of the display and said second row of lights are the ends of a second bundle of optical fibers the opposite ends of which are illuminated by a heading command light souce remote from the field of view of the display.

20. An aircraft control system display as recited in claim 19 further comprising means for energizing said thrust command light source when a thrust command signal is generated and means for energizing said heading command light source when a heading command signal is generated.

21. An aircraft control system display as recited in claim 20 further comprising means for retracting said single indictor from the field of view of the display when neither thrust or heading command signals are generated.

* * * * *